United States Patent
Beaujot et al.

(10) Patent No.: US 7,147,241 B2
(45) Date of Patent: Dec. 12, 2006

(54) STEERING DEVICE FOR TOWED IMPLEMENTS

(75) Inventors: Pat Beaujot, Langbank (CA); Penny Howells, Wolseley (CA); Bruce Wilton, Langbank (CA); Brian Dean, Langbank (CA); Brian Kent, Langbank (CA)

(73) Assignee: One Pass Implements Inc., Langbank (CA)

( * ) Notice: Subject to any disclaimer, the term of this patent is extended or adjusted under 35 U.S.C. 154(b) by 35 days.

(21) Appl. No.: 10/428,120

(22) Filed: May 2, 2003

(65) Prior Publication Data

US 2004/0217575 A1  Nov. 4, 2004

(51) Int. Cl.
*B62D 13/00* (2006.01)
*B62D 13/02* (2006.01)

(52) U.S. Cl. .................. 280/442; 280/443; 280/444; 280/445; 280/441

(58) Field of Classification Search ............... 280/442, 280/443, 444, 445, 441
See application file for complete search history.

(56) References Cited

U.S. PATENT DOCUMENTS

| | | | |
|---|---|---|---|
| 2,152,511 A * | 3/1939 | Vanderwerf ............... 280/443 |
| 3,212,793 A * | 10/1965 | Dominic .................. 280/443 |
| 3,312,480 A * | 4/1967 | Greenstreet .............. 280/443 |
| 4,031,963 A | 6/1977 | Poggemiller et al. |
| 4,037,519 A | 7/1977 | Miller et al. |
| 4,145,980 A | 3/1979 | Boots |
| 4,295,659 A * | 10/1981 | Mergen ................... 280/405.1 |
| 4,878,543 A | 11/1989 | Kauss |
| 5,181,572 A | 1/1993 | Andersen et al. |
| 5,244,226 A | 9/1993 | Bergh |
| 5,307,611 A | 5/1994 | Vardeman et al. |
| 5,329,451 A * | 7/1994 | Notsu ...................... 701/41 |
| 5,339,906 A | 8/1994 | Fox et al. |
| 5,343,677 A | 9/1994 | Covington et al. |
| 5,351,635 A | 10/1994 | Hulicsko |
| 5,364,116 A * | 11/1994 | Houle et al. ............. 280/442 |
| 5,477,459 A | 12/1995 | Clegg et al. |
| 5,477,937 A | 12/1995 | Chagnon |
| 5,579,228 A * | 11/1996 | Kimbrough et al. ........ 701/41 |
| 5,606,504 A | 2/1997 | Andersen |
| 5,694,751 A | 12/1997 | Behnke |
| 5,715,665 A | 2/1998 | Diekhans et al. |
| 5,828,971 A | 10/1998 | Diekhans et al. |
| 5,911,669 A | 6/1999 | Stentz et al. |
| 6,050,008 A | 4/2000 | Doornek et al. |

(Continued)

FOREIGN PATENT DOCUMENTS

FR  2034151  12/1970

*Primary Examiner*—Lesley D. Morris
*Assistant Examiner*—Marlon Arce-Diaz
(74) *Attorney, Agent, or Firm*—Bennett Jones LLP

(57) ABSTRACT

The present invention relates to a steering device for facilitating the steering of an implement towed by a work vehicle. The towed implement, for example, a farm implement such as a seeding device, comprises a main frame having front and rear ends and at least one steerable surface engaging wheel attached to the frame. The steering device comprising a sensor means mounted on the main frame of the towed implement for sensing a misalignment of the towed implement and the work vehicle and producing a signal corresponding to the misalignment. The steering device further comprises a steering means associated with the steerable wheel for receiving the signal produced by the sensor means and for effecting movement of the steerable wheel in response to the signal until the towed implement and the work vehicle are once again realigned.

47 Claims, 8 Drawing Sheets

U.S. PATENT DOCUMENTS

| | | |
|---|---|---|
| 6,079,192 A | 6/2000 | Rasmussen |
| 6,095,254 A | 8/2000 | Homburg |
| 6,105,679 A | 8/2000 | Schubert et al. |
| 6,131,691 A * | 10/2000 | Morch ................ 180/418 |
| 6,179,315 B1 | 1/2001 | Boriack |
| 6,199,000 B1 | 3/2001 | Keller et al. |
| 6,204,949 B1 | 3/2001 | Ishikawa et al. |
| 6,240,711 B1 | 6/2001 | Dillon |
| 6,273,446 B1 | 8/2001 | Paul |
| 6,273,447 B1 | 8/2001 | Vande Berg |
| 6,377,881 B1 | 4/2002 | Mullins |
| 6,397,569 B1 | 6/2002 | Homburg et al. |
| 6,431,576 B1 | 8/2002 | Viaud et al. |
| 6,484,485 B1 | 11/2002 | Dillon |
| 6,523,635 B1 | 2/2003 | Johnston et al. |
| 6,527,078 B1 | 3/2003 | Nelson |
| 6,530,197 B1 | 3/2003 | Christensen et al. |
| 6,604,753 B1 * | 8/2003 | Boyd ................ 280/426 |

* cited by examiner

STEERING DEVICE FOR TOWED IMPLEMENTS

FIELD OF THE INVENTION

The present invention relates to a steering device for a farm implement having at least one steerable wheel that is towed by a work vehicle such as an agricultural tractor. In particular, the present invention relates to a steering device that helps a towed implement manoeuvre around an obstruction, such as a slough, or keeps the implement in alignment with a work vehicle when the work vehicle is traversing a slope.

BACKGROUND OF THE INVENTION

Many seeding and harvesting equipment are designed to be drawn behind tractors and the like. Most of these towed devices are steered primarily by the tractor and do not have their own steering mechanisms.

Under certain circumstances, however, it would be advantageous to be able to steer a towed implement independently from the tractor that is pulling it. For example, with seeding implements it is desirable for the seeding implement to remain aligned with the tractor at all times during seeding in order to obtain straight and even seed rows. However, often when a tractor is traversing in a direction perpendicular to the slope of the land, there is a tendency for the towed seeding implement to start "side slipping" or moving in the direction of the slope thereby falling out of alignment with the tractor. This results in uneven crop rows.

Another circumstance when it would be desirable to have an independently steerable implement would be where a tractor must manoeuvre the implement around an obstruction such as a slough, telephone pole, large boulder and the like. If the towed implement does not have independent steering, there is a tendency for the towed implement to "cut corners" thereby, in the case of a seeding implement, the seeding openers are moving sideways instead of straight ahead, which is the intended use.

Thus, a towed implement having independent steering would be able to steer itself back into alignment with the tractor. This can be accomplished by equipping the towed implements with at least one steerable surface engaging wheel, and more preferably, with two steerable surface engaging wheels attached to the rear of the main frame of the towed implement. Steering can either be automatically controlled by means of a turning sensor or could be operator controlled.

French Patent No. 2034151 ("'151") teaches the use of ropes and pulleys to steer the rear wheels of a towed implement. In this instance, ropes are attached to the front hitch that connects the implement to the tractor and to two pivotally mounted wheels. When the angle of the front hitch strays from 90° relative to the front end of the main frame, the attached ropes are pulled in the direction of the hitch. The ropes, which are also attached to the rear wheels, will then pull the rear wheels to a degree corresponding to the angle of the hitch.

The system taught in '151 is undesirable for several reasons. First, the system would be constantly re-adjusting the angle of the rear wheels, resulting in the towed implement "wobbling" down the field. Second, if the side-hills on which the towed implement is being towed are particularly steep, the excess tension on the ropes could cause the ropes to break. Finally, there is no method for the operator to be able to control the amount the implement turns.

SUMMARY OF THE INVENTION

The present invention relates to a steering device for facilitating the independent steering of a towed implement. The present invention allows a towed implement to correct any misalignment with the vehicle towing the implement and allow the implement to stay on course once such realignment has been achieved. In particular, the present invention does not require constant re-adjustment so the towed implement does not wobble down the field when traversing a hill.

In its broadest embodiment, the present invention relates to a steering device for facilitating the steering of an implement towed by a work vehicle, said implement comprising a main frame having front and rear ends and at least one steerable ground engaging wheel attached to said frame, comprising:

(a) a sensor means comprising a ground engaging sensor member having side to side movement about a vertical axis, said sensor means mounted on the frame of the towed implement for sensing a sideways displacement of the towed implement and producing a signal corresponding to said displacement; and (b) a steering means associated with said steerable wheel for receiving said signal and for effecting movement of said steerable wheel in response to said signal.

In one embodiment, the present invention provides a steering device, which steers the towed implement in response to a ground engaging sensor member. The ground engaging sensor member is mounted to the frame of the implement in such a fashion that if there is sideways movement of the frame at that location, the sensor member will move in a direction opposite to that of the frame and send the appropriate signal to one or more steerable wheels to turn accordingly. Therefore, the sensor member may be either pivotally mounted to said frame to allow it to move from side to side about a vertical axis or be rigidly mounted to said frame but have a degree of flexibility allowing it to move from side to side about a vertical axis.

Thus, in accordance with one embodiment of the present invention, a steering device for facilitating the steering of an implement towed by a work vehicle, said implement comprising a main frame having front and rear ends and at least one steerable ground engaging wheel attached to said frame, is provided, comprising:

(a) a ground engaging sensor member having a first and second end, said first end mounted to said frame such that said second end engages the ground, said ground engaging sensor member having side to side movement about a vertical axis and being in a neutral position when it is traveling in a plane perpendicular to a horizontal member of the frame;

(b) a sensing means responsively associated with said ground engaging sensor member for sensing the side to side movement of said ground engaging sensor member and for creating a signal corresponding to said side to side movement; and (c) a steering actuating means associated with said steerable wheel for receiving said signal and for effecting movement of said steerable wheel in response to said signal until the sensor member is back to the neutral position.

In a preferred embodiment, the implement is a seeding device having a main frame, a plurality of individual seeders attached to the main frame and two steerable wheels positioned at the rear of the main frame.

In another preferred embodiment, the surface engaging sensor member is pivotally mounted to the frame and comprises at least one arm carrying a rotatable wheel, a rolling disc or coulter, or a skid, all of which are capable of riding on or engaging the ground.

In another preferred embodiment, the sensor member is kept in constant engagement with the surface by means of a hydraulic or pneumatic cylinder, a spring biasing means or simply the force of gravity upon the sensor member.

In another preferred embodiment, the sensor member is mounted more rigidly but the sensor member itself is flexible thus capable of side to side movement about a vertical axis.

In another preferred embodiment, the sensing means comprises a valve means responsive to the mechanical movement of said sensor member, said valve means having a receiving port for receiving a source of hydraulic fluid or air and a pair of supply ports for supplying hydraulic fluid or air (i.e. the signal) to the steering actuating means so that when the sensor member moves in one horizontal direction the valve means releases hydraulic fluid or air through the first supply port and when the sensor member moves in the opposite horizontal direction the valve means releases hydraulic fluid or air through the second supply port.

In another preferred embodiment, the sensor member further comprises a potentiometer for producing an electrical signal corresponding to the direction of the horizontal movement of said sensor member and the sensing means comprises a valve means responsive to said electrical signal produced by said potentiometer. In this embodiment, the valve means comprises a receiving port for receiving a source of hydraulic fluid or air and a pair of supply ports for supplying hydraulic fluid or air to the actuator means so that when an electrical signal is given corresponding to the sensor member moving in one horizontal direction the valve means releases hydraulic fluid or air through the first supply port and when an electrical signal is given corresponding to the sensor member moving in the opposite horizontal direction the valve means releases hydraulic fluid or air through the second supply port.

In another preferred embodiment, said actuator means comprises at least one hydraulic or pneumatic cylinder having first and second chambers, whereby when the sensing means provides a signal comprising hydraulic fluid or air, the hydraulic fluid or air is directed to one or the other of the chambers thereby causing the cylinder rod 62 to move horizontally and effect movement of said steerable wheel either to the left or to the right relative to the direction of travel of the tractor.

In a further preferred embodiment, the actuating means comprises at a hydraulic or pneumatic cylinder having first and second chambers, whereby one end of the cylinder is attached to one steerable wheel and the other end of the cylinder is attached to the other steerable wheel such that each steerable wheel moves in the same direction in response to said signal received.

In another embodiment of the present invention, both the towing vehicle and the towed implement are each equipped with an antenna that can receive Global Positioning System (GPS) satellite signals. A receiver/CPU is provided which can compare the relative position of the towing vehicle to the position of the towed implement. Thus, if the towed implement is off track relative to the towing vehicle, the receiver can send an appropriate signal to the steerable wheels to turn accordingly.

Thus, in accordance with another embodiment of the present invention, a steering device for facilitating the steering of an implement towed by a work vehicle, said implement comprising a frame having front and rear ends and at least one steerable ground engaging wheel attached to said frame, is provided, comprising:

(a) means for determining the location of the centre of said towed implement and the location of the centre of said work vehicle and for producing a first signal when the centre of said towed implement and the centre of said work vehicle are misaligned;

(b) a sensing means for receiving said first signal and creating a second signal corresponding to the position of said towed implement in relation to said work vehicle; and (c) a steering actuating means associated with said steerable wheel for receiving said second signal and for effecting movement of said steerable wheel in response to said second signal until the centre of said towed implement and the centre of said work vehicle are in alignment.

In a preferred embodiment, the means for determining the location of the centre of said towed implement and the location of the centre of said work vehicle and for producing a signal when the centre of said towed implement and the centre of said work vehicle are misaligned comprises a first global positioning antenna located on said work vehicle, a second global positioning antenna located on said towed implement and a receiver.

In another preferred embodiment, the sensing means comprises a steering control valve means responsive to said first signal which producing a second signal in the form of the release of hydraulic fluid or air. The steering actuating means comprises at least one hydraulic or pneumatic cylinder operative to steer the steerable ground engaging wheel.

DETAILED DESCRIPTION OF THE PREFERRED EMBODIMENT

Figure 1:
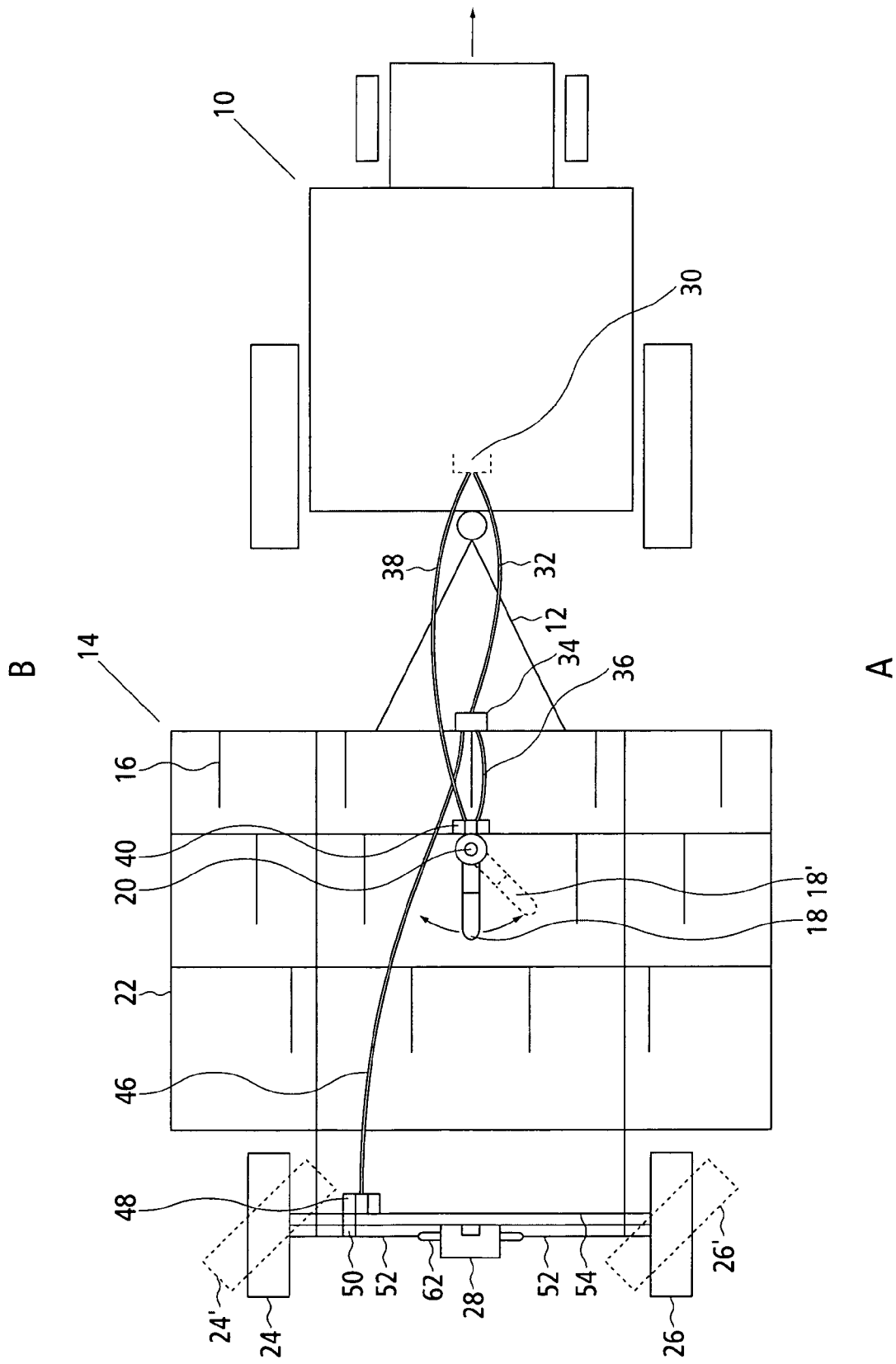
FIG. 1 is a schematic top view of a towing vehicle and a towed implement having a steering device of the present invention.
Figure 2:
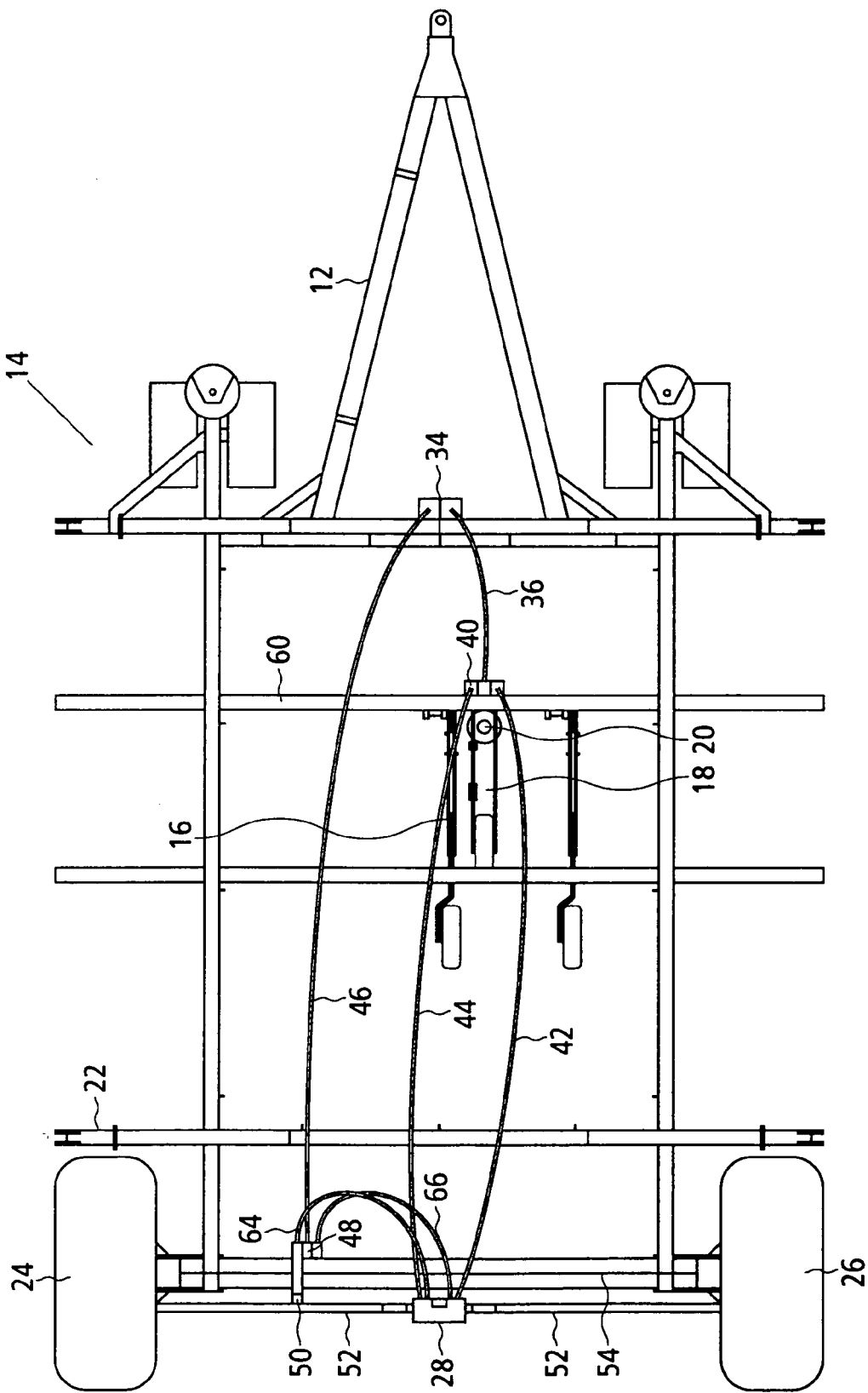
FIG. 2 is a schematic top view of a towed seeding device having a steering device of the present invention.

Referring now to the drawings in general, and in particular to FIGS. 1, 2 and 3, the number 10 refers to a tractor operable to pull a trailing (or) towed agricultural implement, which in this preferred embodiment is seeding device 14. Seeding device 14 is connected to tractor 10 by means of front hitch assembly 12. Seeding device 14 comprises a main frame 22 having a plurality of horizontal bars 60 on which a plurality of ground engaging individual seeders or openers 16 are mounted. In this embodiment, two steerable wheels 24, 26 are connected to axle 54 by conventional castoring means to allow the steerable wheels to pivot about a vertical axis. Axle 54 is mounted to the rear of frame 22.

The steering device of the present invention comprises a ground engaging sensor member 18 which is pivotally mounted more or less in the centre of frame 22 on one of the horizontal bars 60, i.e. so that ground engaging sensor member 18 is essentially in the centre of the gang of openers 16. Thus, sensor member 18 is pivotally mounted at a position that results in the least amount of sideways motion of the ground engaging individual openers 16 when seeding device 14 is kept in alignment with tractor 10 by means of the present invention.

Sensor member 18 is attached to frame 22 by means of a pivot 20 allowing horizontal or side-to-side movement of the sensor member 18 relative to horizontal bars 60. Sensor member 18 thus acts more or less like a pendulum. When the vertical plane of the sensor member 18 is positioned at a 90° angle relative to the horizontal bars 60 it is considered to be in the neutral position and the tractor 10 and seeding device 14 are in alignment.

Figure 3A:
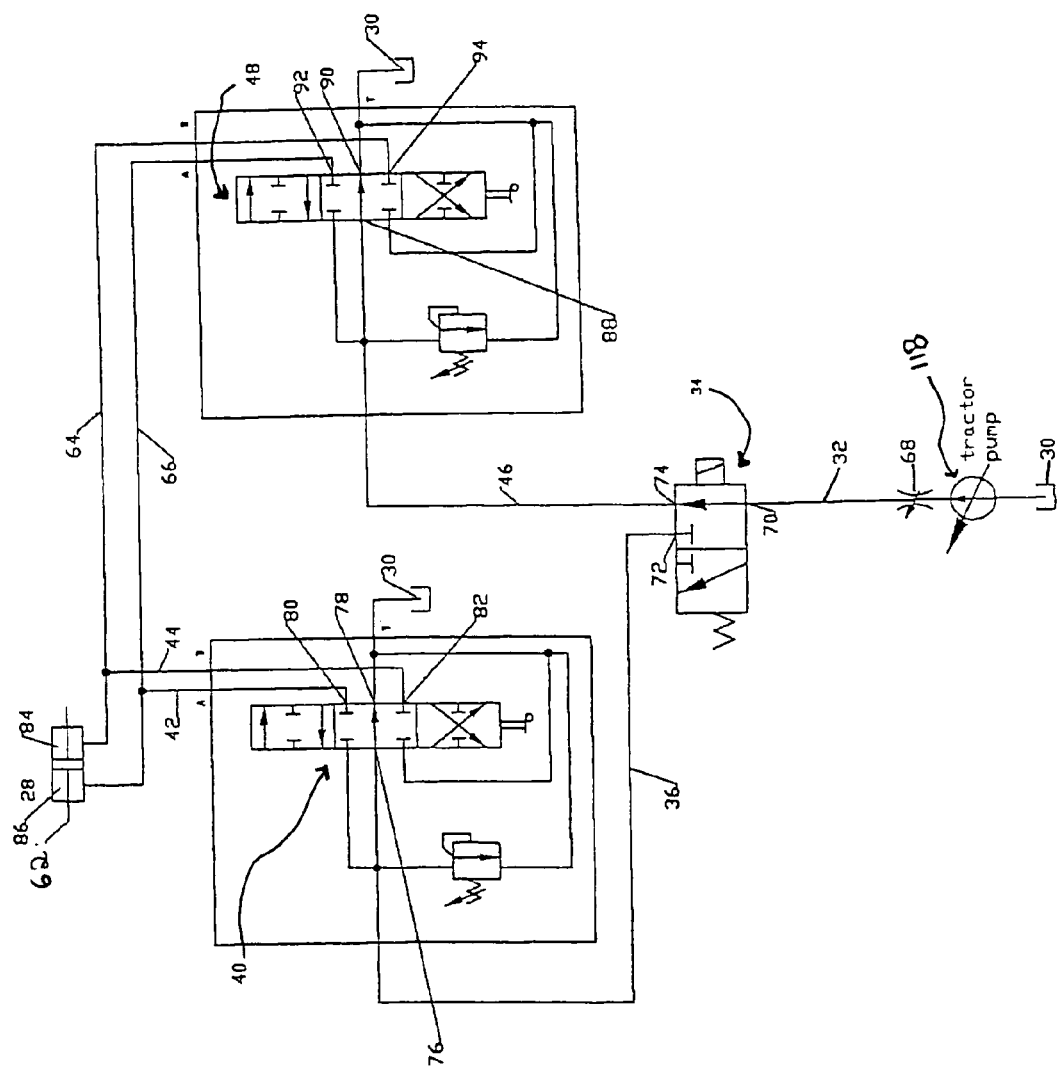
FIG. 3a is a schematic of the hydraulic circuit for the steering device of FIG. 2.

Sensor member 18 is operably linked to a sensing means comprising steering control valve 40. Steering control valve 40 is a 4 port-3 position valve, for example, a Walvoil SD4/1(KG3-120)/1CP18L-SAE valve (as shown in FIG. 3*a*). In this embodiment, steering control valve 40 is a mechanical valve operably linked to sensor member 18 in such a fashion that when sensor member 18 goes off of 90°, a mechanical force is asserted on steering control valve 40 to activate a lever in one direction or the other.

Figure 3B:
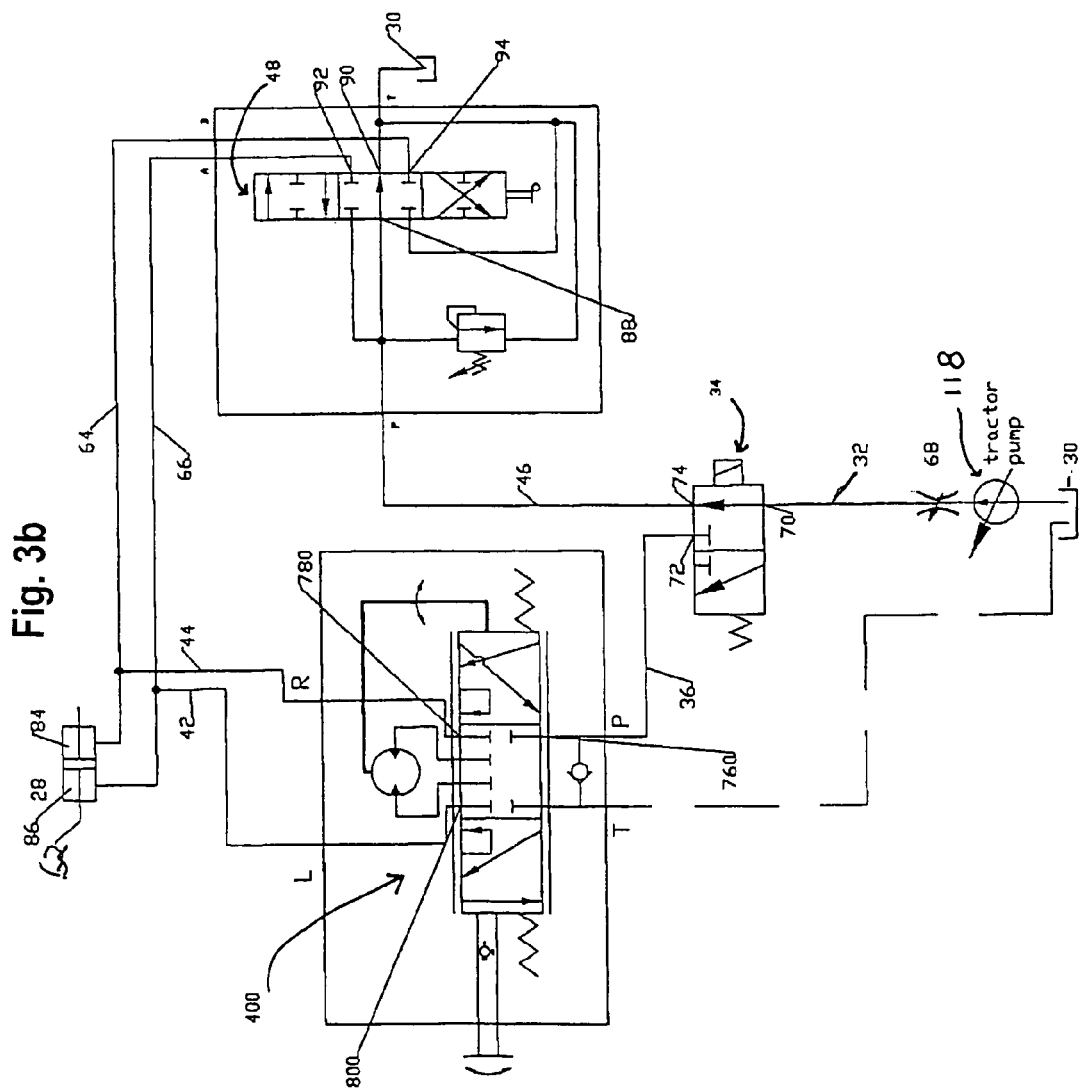
FIG. 3b is a schematic of the hydraulic circuit of an alternate embodiment for the steering device of FIG. 2.

In another preferred embodiment, sensor member 18 is operably linked to a sensing means comprising a closed centre, non-load reaction steering control valve, which is shown schematically in FIG. 3*b* and labelled numerically as 400. An example of one such steering control valve is Eaton Steering Control Unit Series 6 212-1069.

In another preferred embodiment, steering control valve 40 is a 4 port-3 position solenoid valve (not shown) capable of receiving an electrical signal, which activates an electromagnet that shifts the position of the valve, altering the course of hydraulic fluid flow. In this embodiment, sensor member 18 further comprises a potentiometer (not shown), which sends an electronic signal to a solenoid steering control valve that corresponds to movement of the sensor member either to the right of centre (i.e. centre being when the sensor member is perpendicular to the frame and thus in neutral position) or to the left of centre.

Steering control valve 40 operates to control a steering actuating means, which in this embodiment comprises a horizontally adjustable hydraulic cylinder, commonly called a double-acting hydraulic cylinder 28, by sending a signal (i.e. in this case, sending a volume of hydraulic fluid) instructing hydraulic cylinder 28 to move the cylinder rod 62 left or right. Hydraulic cylinder 28 is operably attached at either end to steerable wheels 24 and 26 by means of two tie rods 52.

With particular reference to FIGS. 2, 3*a* and 3*b*, the present invention will now be described when in operation. The operator of tractor 10 will be able to control when to put the steering device of the present invention into action. Generally, however, it is desirable that the steering device be operable during the entire seeding procedure. An electronic switch, generally situated in the cab of the tractor, turns on the steering 372 device. The switch sends an electronic signal to diverter valve 34, which in this embodiment is a 3 port-2 position directional solenoid valve having one receiving port 70 and two supply ports 72 and 74.

Tractor 10 is equipped with hydraulic fluid reservoir 30 that supplies hydraulic fluid to receiving port 70 of diverter valve 34 via hydraulic line 32. Generally, flow control needle valve 68 controls the flow of hydraulic fluid from reservoir 30 through pump 118 to diverter valve 34. Thus, when the operator manually turns on the switch necessary to operate the steering device of the present invention, the electronic signal is sent to diverter valve 34 opening supply port 72.

In the case when steering control valve 40 is used, hydraulic fluid is directed to steering control valve 40 via hydraulic line 36 through receiving port 76 and the steering device is activated and continuously operating. When sensor member 18 is in the neutral position (i.e. its vertical plane is perpendicular to the frame), for example, in instances where seeding in a straight line on a level ground surface, the centre supply port 78 of steering control valve 40 is open and hydraulic fluid from the diverter valve 34 is simply recycled back to hydraulic fluid reservoir 30. Hence, the steering device is considered to be in neutral and the steerable wheels 24 and 26 are not activated (i.e. they are not turning). Those skilled in the art would recognize this as an open-centre system.

In the alternative, when using steering control valve 400, the centre port 780 is closed when sensor member 18 is in the neutral position (i.e. its vertical plane is perpendicular to the frame). Thus, hydraulic fluid is only released by steering control valve 400 when the sensing member is either to the left or right of 90°. Therefore, hydraulic fluid does not constantly have to recycle when the work vehicle and the farm implement are in alignment. Those skilled in the art would recognize this as an open-centre system.

When tractor 10 and trailing seeding device 14 are traversing a slope or hill, the tendency is for the seeding device 14 to "fall" or sideslip down the slope and the desire is to correct this slippage by changing the direction of the steerable wheels. Side slipping causes the sensor member 18 pivot to one side or the other relative to the ground and the frame 22. For example, when traversing a slope where area "A" as shown in FIG. 1 is of higher elevation than area "B", this causes frame 22 to slide downhill toward area "B" and sensor member 18 to pivot to the right relative to the frame (as shown in phantom in FIG. 1 as sensor member 18'). The rotation of sensor member 18 to the position of sensor member 18' will activate steering control valve 40 by activating a lever which mechanically opens the right supply port 82 of steering control valve 40. Hydraulic fluid is then released through supply port 82.

Figure 6:
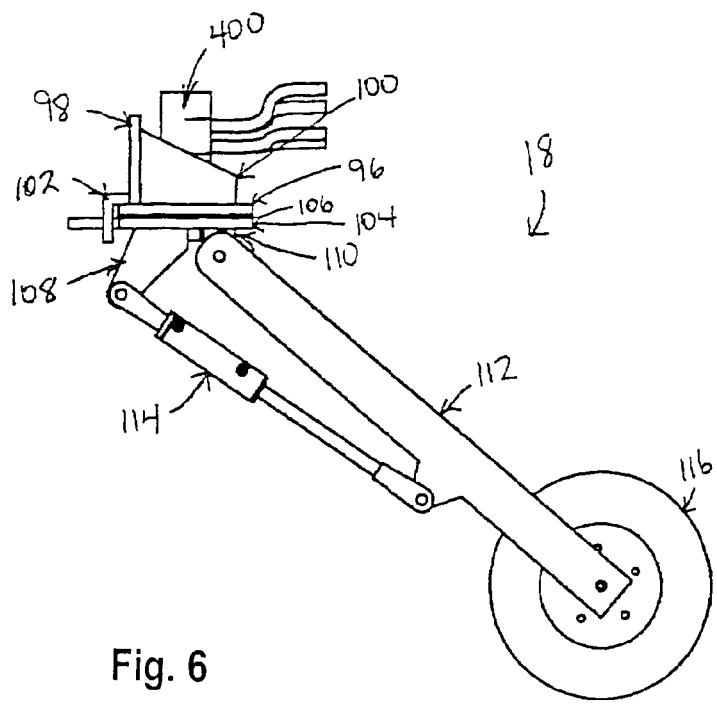
FIG. 6 is a side view of the ground engaging sensor member of the present invention utilizing one embodiment of the steering control valve means.
Figure 7:
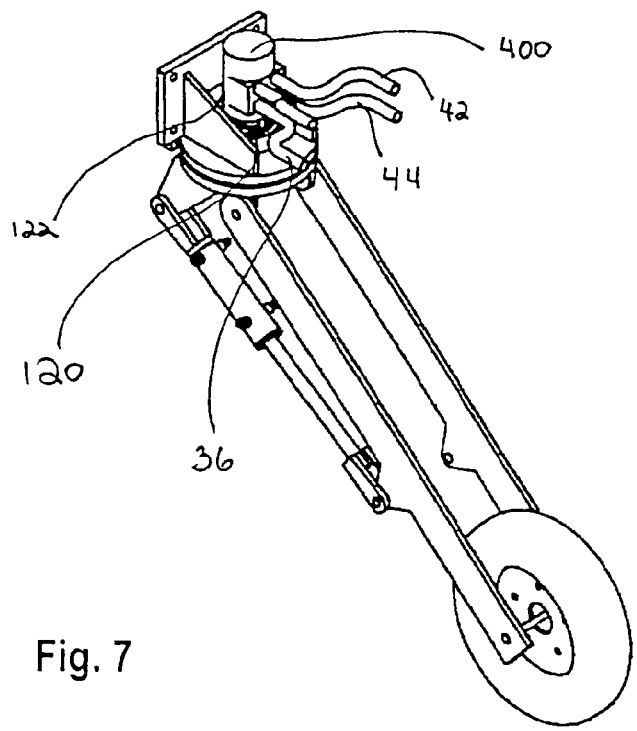
FIG. 7 is a perspective view of the ground engaging sensor member of FIG. 6.

When steering control valve 400 is used, valve 400 is operably attached to pivot pin 120 of sensor member 18 (shown in more detail in FIGS. 6 and 7). Thus, when sensor member 18 pivots to one side, the internals of steering control valve 400 rotate to open either supply port 780 or supply port 800. The greater the rotation of sensor member 18, the larger the opening will be of supply ports 780 or 800. Hence, the amount of released hydraulic fluid, which will dictate the degree of rotation of the steerable wheels, is directly proportional to the degree of rotation of sensor member 18.

In yet another embodiment, the sensor member 18 is linked to a potentiometer (not shown), which sends an electronic signal to activate steering control valve 40.

Hydraulic line 44, which is linked to right supply port 82 or 820, then transports the released hydraulic fluid to a steering actuating means. In the present embodiment, steering actuating means is a double-acting hydraulic cylinder 28. Double-acting hydraulic cylinder 28 comprises first and second chambers, 84 and 86, respectively. Thus, when the steering control valve 40 (or 400) releases hydraulic fluid through the right supply port 82 (or 820) said hydraulic fluid is directed via hydraulic line 44 to the first chamber 84 of the hydraulic cylinder 28 causing the hydraulic cylinder rod 62 to move position (i.e. either to the left or to the right). Because the hydraulic cylinder is operably connected at each end by means of tie rods 52 to steerable wheels 24 and 26, when hydraulic cylinder rod 62 moves steerable wheels will rotate or turn into the slope, i.e. towards area "A" (shown in phantom in FIG. 1 as steerable wheels 24' and 26').

Now assuming that area "B" is of higher elevation than area "A", the sensor member 18 will pivot to the left relative to the frame. The rotation of sensor member 18 will activate steering control valve 40 (or 400) to open the left supply port 80 (or 800) and hydraulic fluid is then released through said port via hydraulic line 42 to double-acting hydraulic cylinder 28. Hydraulic fluid is released into second chamber 86 of hydraulic cylinder 28, which causes the hydraulic cylinder rod 62 to move and in turn causes the steerable wheels to rotate or turn into the slope, i.e. towards area "B".

It is understood that other hydraulic or pneumatic cylinders could be used in the present invention and are within the scope of the present invention. For example, a retractable and extensible hydraulic cylinder is particularly useful when the towed farm implement has only one steerable wheel, but could also be adaptable to two wheels, having two tie rods extending from the same end. It is also within the scope of the present invention to use more than one hydraulic cylinder, for example, each steerable wheel could be operated by its own hydraulic cylinder.

Once the steerable wheels are rotated or turned into the slope the sensor member 18 goes back to its neutral position and the centre supply port 78 of steering control valve 40 is open and hydraulic fluid from the diverter valve 34 is simply recycled back to hydraulic fluid reservoir 30. Thus, the steerable wheels 24 and 26 will be "held" in this corrected position during the course of the tractor traversing the slope. However, once tractor 10 and seeding device 16 encounter level ground again, the rotated steerable wheels will cause sensor member 18 to rotate again, this time in the same direction as the steerable wheels 24 and 26. This will cause hydraulic fluid to be supplied to hydraulic cylinder 28 thus rotating the steerable wheels back into alignment with the direction of travel of tractor 10.

Sensor member 18 also acts in a similar fashion as above when the operator wishes to seed while changing direction. In particular, the present steering device is useful when tractor 10 must be manoeuvred around an obstruction such as a slough or telephone pole or the like. When seeding while changing direction, the tendency is for tractor 10 to pull the trailing, towed implement, seeding device 14, off line and hence it will cut across the corner. This will cause sensor member 18 to pivot relative to horizontal bars 60.

By way of example, when tractor 10 is turning around an obstruction on the left side of the obstruction, sensor member 18 pivots to the right, causing hydraulic cylinder rod 62 to shift position, thus turning or rotating the steerable wheels 24 and 26 to the left. This will ensure that the seeding device 14 manoeuvres around the obstruction and doesn't simply "cut the corner" of the turn.

In another preferred embodiment, the trailed agricultural implement can be further equipped with a third valve means, in particular, a centering valve 48. Centering valve 48 is a 4 port-3 position valve, for example, a Walvoil SD4/1(KG3-120)/1CP18L-SAE valve. Centering valve 48 is operably connected to hydraulic cylinder 28 and is operable when seeding device 14 is not in seeding operation.

Two circumstances where centering valve 48 is useful are (1) when tractor is transporting or towing the seeding device to and from the field, and (2) when the seeding device has finished a pass of seeding (i.e. reached the end of the field) and now the tractor must turn the seeding device around for the next seeding pass. During both of these circumstances, the seeding device is not in operational (seeding) mode, i.e. the steering device of the present invention has been deactivated.

In the towing or transport situation, it is desirable to have the steerable wheels in a straight-ahead position. This is accomplished by the operator turning off the steering device of the present invention causing the hydraulic fluid to flow through supply port 74 of diverter valve 70 instead of supply port 72. The hydraulic fluid is transported to receiving port 88 of centering valve 48 via hydraulic line 46. In other words, in this embodiment, when the steering is turned off, the diverter valve 70 automatically turns "on" the centering valve. An alternate embodiment would be to have a diverter valve operable to engage either the centering device, the steering device or none at all.

Operably connected to centering valve 48 is activating lever 50, which is attached at one end to either of tie rods 52 such that when the steerable wheels 24 and 26 are straight ahead, activating lever would be at 90° relative to the tie rods 52. This is considered the centred position, whereby centre supply port 90 would be opened and hydraulic fluid would simply be recycling back to the hydraulic fluid reservoir 30.

If the steerable wheels are not at 90° when the operator wishes to transport the farming implement, the operator would first have to activate the centering valve. Because the steerable wheels are not at 90°, activating lever 50 will also not be at 90° relative to the tie rods 52. Thus, depending upon which direction the steerable wheels are turned, either supply port 92 or supply port 94 will open to provide hydraulic fluid to either chamber 86 or chamber 84 of double-acting hydraulic cylinder 86 via hydraulic lines 66 and 64, respectively. Cylinder rod 62 will in turn shift, which will cause steerable wheels to rotate until they eventually are at 90° to the frame 22. Once this occurs, activating lever 50 will go back to being perpendicular to the tie rods 52, thereby causing the centering valve 48 and hydraulic fluid to bypass back to the tractor reservoir 30.

Figure 4:
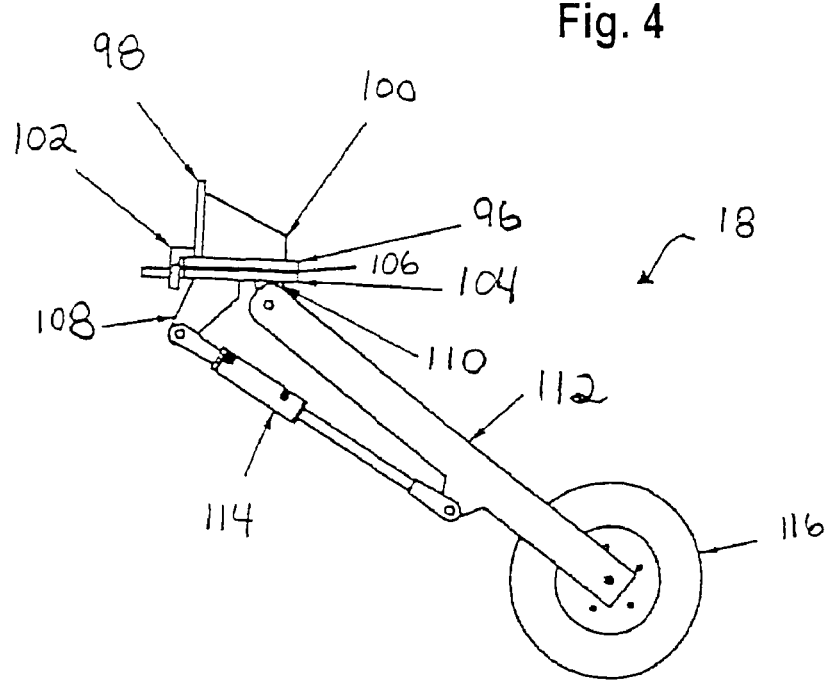
FIG. 4 is a side view of a preferred embodiment of the ground engaging sensor member of the present invention.
Figure 5:
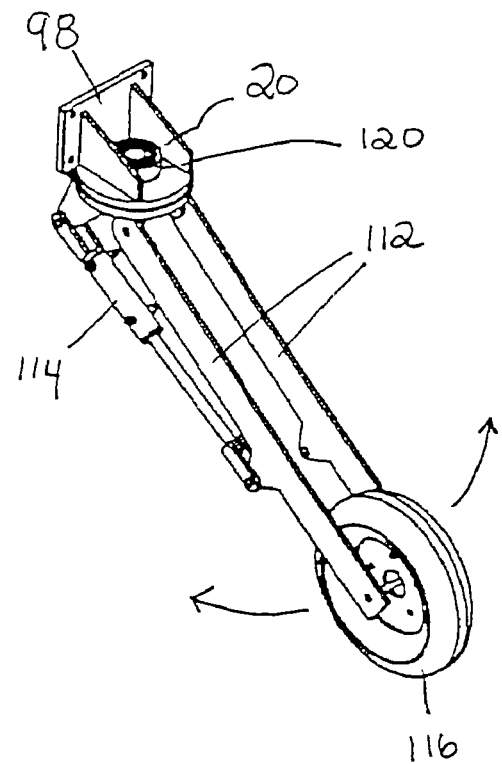
FIG. 5 is a perspective view of the ground engaging sensor member of FIG. 4.

With reference now to FIGS. 4 and 5, the preferred embodiment of the ground engaging sensor member 18 is shown. Ground engaging sensor member 18 comprises top plate 96 and bottom plate 104. Permanently mounted (welded) to top plate 96 is mounting plate 98, which attaches sensor member to one of the horizontal bars 60 of main frame 22. Side plates 100 are provided for support and make the sensor member 18 more rigid. Rotational stops 102 are also provided to limit the rotation of sensor member 18.

Sandwiched between top plate 96 and bottom plate 104 is a wear plate 106, which is preferably made from ultra-high molecular weight nylon (UHMW) that has a low coefficient of friction. Permanently mounted (welded) to bottom plate 104 are arm lugs 110 and, in one embodiment, a hydraulic cylinder mount 108.

Preferably, top plate 96, wear plate 106 and bottom plate 104 are held together by a bolted connection. A bearing is shown in FIG. 5 as a preferred embodiment. A threaded connection would tighten against the bearing to ensure smooth rotation of the sensor member 18.

Sensor member 18 further comprises a pair of downwardly extending sensor arms 112, which are attached to the arm lugs 110 by means of a pinned connection. Sensor wheel 116 is attached to sensor arms 112 by means of a hub and spindle assembly to ensure free rolling of sensor wheel 116 on the ground. It is understood that instead of a sensor wheel, rolling coulters or discs, or a stationery skid could be used.

To ensure that sensor member 18 is engaging the ground at all times, in a preferred embodiment a hydraulic cylinder 114 is attached to cylinder mount 108 at the cap end of the cylinder by means of a pinned connection, and at the rod end of the cylinder to the sensor arms 112, also by means of a pinned connection. Those commonly skilled in the art would understand that a hydraulic pressure would need to be supplied to hydraulic cylinder 114, as well as including in the system a pressure relief valve to relieve excessive pressure from the hydraulic cylinder 114. Excessive pressure may develop if sensor member 18 were to encounter an obstacle, where it is necessary for sensor member 18 to "trip" over such obstacle. Although only one biasing element is shown, it is implied that two biasing elements could also be used. It is understood that other means for providing a force to keep sensor member in constant engagement with the ground would also work, for example, a spring or other type of biasing member. In addition, it would be possible to add mass to sensor member 18 by filling tire 116 with a fluid (i.e. calcium solution), adding sufficient mass that gravity would work as a method of ensuring constant engagement with the ground surface.

With reference now to FIG. 6 and FIG. 7, illustrated here is the means by which steering control valve 400 is linked to sensor member 18 for operation. Steering control valve 400 comprises mounting plate 122, which is welded to mounting plate 98. Steering control valve 400 is operably connected to pivot pin 120 such that rotation of pivot pin 120 will cause either the left supply port or the right supply port of steering control valve 400 to be open. When either supply port is open, hydraulic fluid will be released through hydraulic lines 42 or 44 to hydraulic cylinder.

Figure 8:
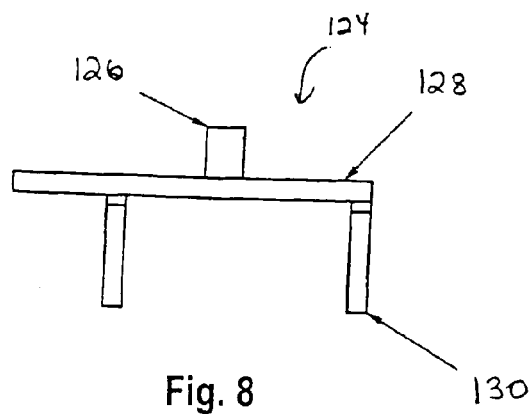
FIG. 8 is a side view of a preferred embodiment of the castoring device used to rotate the steerable wheels of the present invention.
Figure 9:
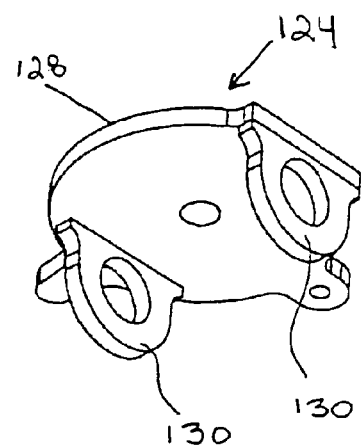
FIG. 9 is a bottom perspective view of the castor device of FIG. 8.

With reference now to FIGS. 8, 9, 10, 11 and 12, one embodiment of the ground engaging steerable wheels of the present invention will be described. Essentially, steerable wheels 24 and 26 are attached to axle 54 by conventional castoring means. With reference first to FIGS. 8 and 9, bottom castoring assembly 124 comprises castor pivot shaft 126, which is permanently attached (welded) to bottom plate 128. Also permanently attached to bottom plate 128 are two spindle mounts 130. Additionally, securing hardware is also permanently attached to bottom plate 128, which would allow the spindle 138 to be removed should it become damaged. Alternatively, spindle 138 could be permanently attached (welded) to the spindle mounts 130.

Figure 10:
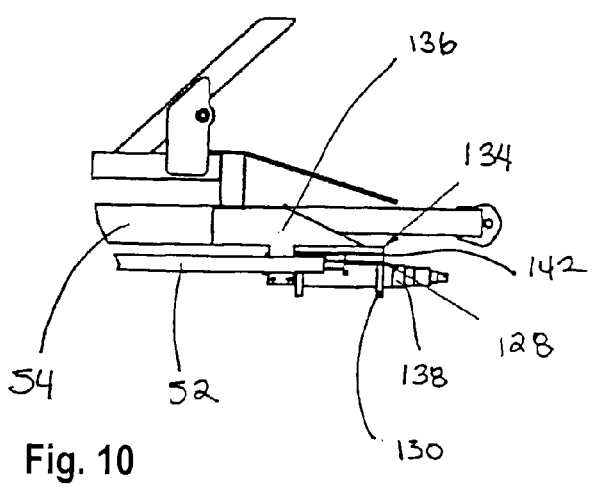
FIG. 10 is a rear view of the assembled castoring device.
Figure 11:
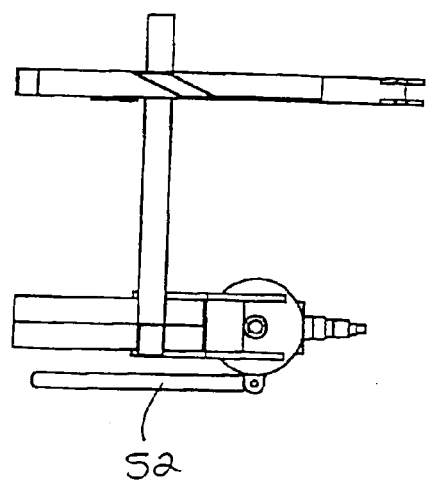
FIG. 11 is a top view of the assembly of FIG. 10.
Figure 12:
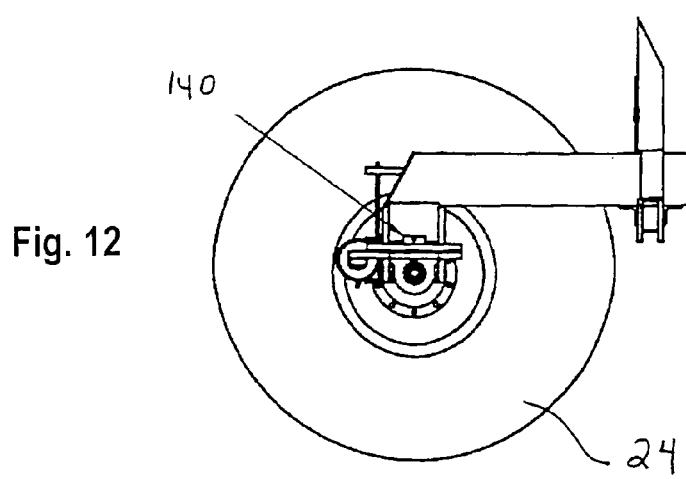
FIG. 12 is a side view of the assembly of FIG. 10.

FIGS. 10, 11 and 12 show one of the steerable wheels 24 attached to spindle 138 in conventional way. Axle 54 comprises at each end gusset 136 and castor top plate 134. Sandwiched between top plate 134 and bottom plate 128 is wear plate 142, which is preferably made from ultra-high molecular weight nylon (UHMW) that has a low coefficient of friction. Pivot shaft 126 passes through wear plate 142 and top plate 134 and is secured by collar 140 and a pin (not shown), pivotally connecting bottom castoring assembly 124 and top castor plate 134.

Tie rod 52 attaches to bottom plate 128 as best shown in FIG. 11. Bottom castoring assembly 124 is free to pivot about pivot shaft 126, which results in the direction of travel of wheel 24 to be altered with respect to the main frame's direction of travel.

Figure 13:
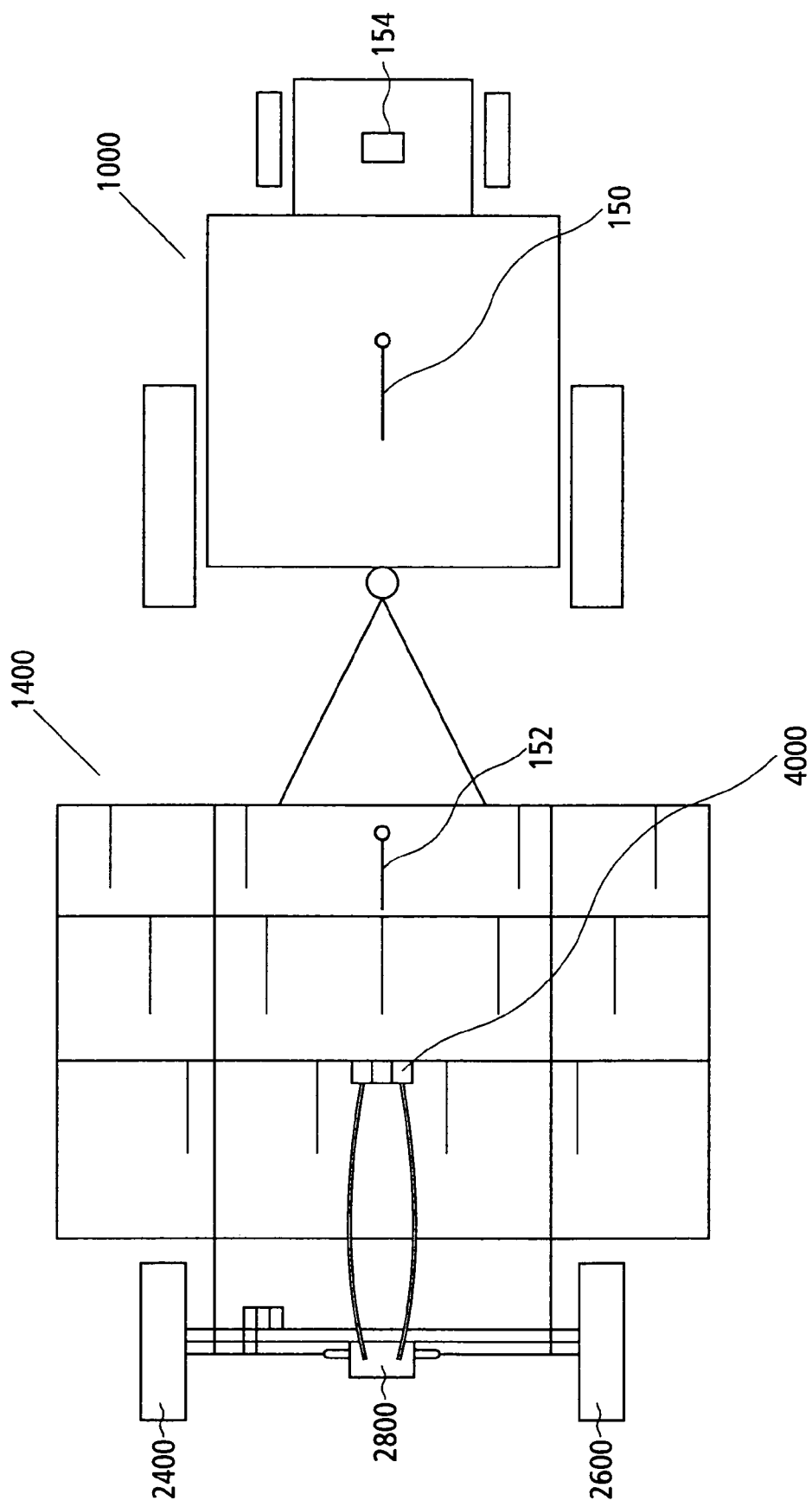
FIG. 13 is a schematic top view of a preferred embodiment of a towing vehicle and a towed implement each equipped with GPS antennae.

With reference now to FIG. 13, another embodiment of the present invention is shown. The work vehicle, tractor 1000, and the towed implement, the seeding device 1400, are equipped with global positioning antennae 150 and 152, respectively. In a preferred embodiment, global positioning antenna 150 is placed in the centre of tractor 1000 and global positioning antenna 152 is placed in the centre of the seeding device 1400. It is understood, however, that any location would work if the appropriate software were provided. GPS receiver/CPU 154 can track the precise location of the centre of the tractor 1000 and the same receiver/CPU 154 can also identify the precise location of the centre of the seeding device 1400, thus will be able to determine if both the tractor 1000 and the seeding device 1400 are in alignment and following the same path.

If the seeding device 1400 starts to sideslip when the tractor 1000 is traversing a slope, the path of the seeding device will now be different from the path of the tractor. Depending upon the direction of the slope, the path of the seeding device 1400 will be to the right or to the left of the tractor 1000. The receiver/CPU will be able to determine exactly to what degree the seeding device 1400 is off course from the tractor 1000 and will send an electrical signal that will activate an electromagnetic hydraulic steering control valve 4000, which would operate in much the same fashion as steering control valve 40, described above. The steering control valve would activate double-ended hydraulic cylinder 2800, causing steerable wheels 2400 and 2600 to rotate accordingly.

While various embodiments in accordance with the present invention have been shown and described, it is understood that the same is not limited thereto, but is susceptible to numerous changes and modifications as known to those skilled in the art, and therefore the present invention is not to be limited to the details shown and described herein, but is intended to cover all such changes and modifications as are encompassed by the scope of the appended claims.

We claim:

1. A steering device for facilitating the steering of an implement towed by a work vehicle, said implement comprising a main frame having front and rear ends and at least one steerable ground engaging wheel attached to said frame, comprising:
    (a) a sensor means mounted on the frame of the towed implement for sensing a sideways displacement of the towed implement and producing a signal corresponding to said displacement, said sensor means comprising a ground engaging sensor member having side to side movement about a vertical axis and a valve means responsively associated with the ground engaging sensor member for sensing the side to side movement of the ground engaging sensor member and producing the signal in response thereto; and (b) a steering means associated with the at least one steerable wheel for receiving said signal and for effecting movement of the at least one steerable wheel in response to said signal.

2. A steering device as claimed in claim 1 wherein said signal comprises hydraulic fluid or air.

3. A steering device as claimed in claim 2 wherein said steering means comprises a double acting hydraulic or pneumatic cylinder.

4. A steering device as claimed in claim 1 further comprising at least two steerable ground engaging wheels attached to the rear end of said frame.

5. A steering device as claimed in claim 1 wherein said towed implement comprises a gang of individual seed openers attached to said frame for engaging the ground.

6. A steering device as claimed in claim 1 wherein said ground engaging sensor member is mounted to said frame by means of a pivot.

7. A steering device as claimed in claim 6 wherein said ground engaging sensor member comprises at least one arm carrying a rotatable wheel that rides on the ground.

8. A steering device as claimed in claim 6 wherein said ground engaging sensor member comprises at least one arm carrying a rolling coulter or disc that rides on the ground.

9. A steering device as claimed in claim 6 wherein said ground engaging sensor member comprises a shaft carrying a skid that rides on the ground.

10. A steering device as claimed in claim 6 wherein said sensor member engages the ground by engaging means selected from the group consisting of a hydraulic cylinder biasing means, a pneumatic cylinder biasing means, a spring biasing means or the addition of sufficient mass to cause gravity to act as a biasing means.

11. A steering device as claimed in claim 1 wherein said ground engaging sensor member comprises at least one flexible arm.

12. A steering device as claimed in claim 11 wherein said flexible arm further comprises a rolling member selected from the group consisting of a wheel, a disc or a coulter.

13. A steering device as claimed in claim 3 wherein said double acting hydraulic or pneumatic cylinder is a retractable and extensible cylinder.

14. A steering device for facilitating the steering of an implement towed by a work vehicle, said implement comprising a main frame having front and rear ends and at least one horizontal member, said implement further comprising at least one steerable ground engaging wheel attached to said frame, comprising:

(a) a ground engaging sensor member having a first and second end, said first end mounted to said frame such that said second end engages the ground, said ground engaging sensor member having side to side movement about a vertical axis and being in a neutral position when it is traveling in a plane substantially perpendicular to the horizontal member of the frame;

(b) a sensing means comprising a steering control valve means, said sensing means being responsively associated with said ground engaging sensor member for sensing the side to side movement of said ground engaging sensor member and for creating a signal corresponding to said side to side movement; and (c) a steering actuating means associated with the at least one steerable wheel for receiving said signal and for effecting movement of the at least one steerable wheel in response to said signal until the ground engaging sensor member is back to the neutral position.

15. A steering device as claimed in claim 14 further comprising at least two steerable ground engaging wheels attached to the rear end of said frame.

16. A steering device as claimed in claim 14 wherein said towed implement comprises a gang of individual seed openers attached to said frame for engaging the ground.

17. A steering device as claimed in claim 14 wherein said ground engaging sensor member is mounted to said frame by means of a pivot.

18. A steering device as claimed in claim 17 wherein said ground engaging sensor member comprises at least one arm carrying a rotatable wheel that rides on the ground.

19. A steering device as claimed in claim 17 wherein said ground engaging sensor member comprises at least one arm carrying a rolling coulter or disc that rides on the ground.

20. A steering device as claimed in claim 17 wherein said ground engaging sensor member comprises a shaft carrying a skid that rides on the ground.

21. A steering device as claimed in claim 14 wherein said ground engaging sensor member comprises at least one flexible arm.

22. A steering device as claimed in claim 21 wherein said flexible arm further comprises a rolling member selected from the group consisting of a wheel, a disc or a coulter.

23. A steering device as claimed in claim 17 wherein said ground engaging sensor member engages the ground by engaging means selected from the group consisting of a hydraulic cylinder biasing means, a pneumatic cylinder biasing means, a spring biasing means or the addition of sufficient mass to cause gravity to act as a biasing means.

24. A steering device as claimed in claim 14 wherein said signal comprises the release of hydraulic fluid or air.

25. A steering device as claimed in claim 14 wherein said ground engaging sensor member further comprises an electrical signaling means for producing an electrical signal corresponding to the side to side movement of said ground engaging sensor member and said sensing means is adapted to receive said electrical signal.

26. A steering device as claimed in claim 14 wherein said steering control valve means comprises a receiving port for receiving a source of hydraulic fluid or air from a fluid reservoir and a pair of supply ports for supplying hydraulic fluid or air to the steering actuating means, whereby when the ground engaging sensor member moves to one side the steering control valve means releases hydraulic fluid or air through the first supply port and when the ground engaging sensor member moves to the opposite side the steering control valve means releases hydraulic fluid or air through the second supply port.

27. A steering device as claimed in claim 25 wherein said sensing means comprises a steering control valve means responsive to said electrical signal produced by said electrical signaling means.

28. A steering device as claimed in claim 27 wherein said steering control valve means comprises a receiving port for receiving a source of hydraulic fluid or air from a fluid reservoir and a pair of supply ports for supplying hydraulic fluid or air to the steering actuating means, whereby when an electrical signal is given corresponding to the ground engaging sensor member moving to one side the steering control valve means releases hydraulic fluid or air through the first supply port and when an electrical signal is given corresponding to the ground engaging sensor member moving to the opposite side the steering control valve means releases hydraulic fluid or air through the second supply port.

29. A steering device as claimed in claims 26 or 28 wherein said steering control valve means further comprises a third supply port which supplies hydraulic fluid or air back to said fluid reservoir when said ground engaging sensor member is in the neutral position.

30. A steering device as claimed in claim 14 wherein said steering actuating means comprises at least one double acting hydraulic or pneumatic cylinder.

31. A steering device as claimed in claim 30 wherein said double acting hydraulic or pneumatic cylinder further comprises a double-ended piston rod.

32. A steering device as claimed in claims 26 or 28 wherein said steering actuating means comprises at least one double acting hydraulic or pneumatic cylinder having first and second chambers, whereby when said steering control valve means releases fluid or air through the first supply port said fluid or air is directed to the first chamber of the cylinder and when said steering control valve means releases fluid or air through the second supply port said fluid or air is directed to the second chamber of the cylinder.

33. A steering device as claimed in claim 32 whereby when fluid or air is directed to the first chamber of the cylinder, said cylinder causes the at least one steerable wheel to move in one direction and when fluid or air is directed to the second chamber of the cylinder, said cylinder causes the at least one steerable wheel to move in the opposite direction.

34. A steering device as claimed in claim 33 whereby said the at least one steerable wheel moves in a direction necessary to return said ground engaging sensor member to a neutral position.

35. A steering device as claimed in claim 15 wherein said steering actuating means comprises a double acting hydraulic or pneumatic cylinder having first and second chambers, whereby one end of the cylinder is attached to one steerable wheel and the other end of the cylinder is attached to the other steerable wheel such that each steerable wheel moves in the same direction in response to said signal received.

36. A steering device as claimed in claim 16 wherein said ground engaging sensor member is mounted substantially in the centre of said frame.

37. A steering device for facilitating the steering of an implement towed by a work vehicle, said implement comprising a frame having front and rear ends and at least one steerable ground engaging wheel attached to said frame, comprising:
   (a) sensor means for determining the location of the centre of said towed implement and the location of the centre of said work vehicle and for producing a first signal when the centre of said towed implement and the centre of said work vehicle are misaligned or not following the same path;
   (b) a sensing means for receiving said first signal and creating a second signal corresponding to the position of said towed implement in relation to said work vehicle; and
   (c) a steering actuating means associated with the at least one steerable wheel for receiving said second signal and for effecting movement of the at least one steerable wheel in response to said second signal until the towed implement and the work vehicle are in alignment and following the same path.

38. A steering device as claimed in claim 37 wherein said sensor means comprises a first global positioning antenna located on said work vehicle, a second global positioning antenna located on said towed implement and a receiver.

39. A steering device as claimed in claim 37 wherein said sensing means comprises a steering control valve means responsive to said first signal.

40. A steering device as claimed in claim 39 wherein said steering actuating means comprises at least one double acting hydraulic or pneumatic cylinder.

41. A steering device as claimed in claims 1, 14 or 39 further comprising a second valve means for centering the at least one steerable wheel when sensor means is not in operation.

42. A steering device as claimed in claim 25 wherein said electrical signaling means comprises a potentiometer.

43. A steering device for facilitating the steering of a seed drill towed by a work vehicle, said towed seed drill comprising a main frame having front and rear ends, a gang of individual seed openers attached to said frame for engaging the ground, and at least one steerable ground engaging wheel attached to said frame, comprising:
   (a) a sensor means comprising a ground engaging sensor member having side to side movement about a vertical axis, said sensor means mounted on the frame of the seed drill for sensing a sideways displacement of the towed implement and producing a signal corresponding to said displacement; and
   (b) a steering means associated with the at least one steerable wheel for receiving said signal and for effecting movement of the at least one steerable wheel in response to said signal.

44. A steering device for facilitating the steering of an implement towed by a work vehicle, said implement comprising a main frame having front and rear ends and at least one steerable ground engaging wheel attached to said frame, comprising:
   (a) a sensor means comprising a ground engaging sensor member having side to side movement about a vertical axis, said ground engaging sensor member comprising at least one arm or shaft carrying a ground riding means selected from the group consisting of a rolling coulter, a disc and a skid, said ground engaging sensor means pivotally mounted on the frame of the towed implement for sensing a sideways displacement of the towed implement and producing a signal corresponding to said displacement; and
   (b) a steering means associated with the at least one steerable wheel for receiving said signal and for effecting movement of the at least one steerable wheel in response to said signal.

45. A steering device for facilitating the steering of an implement towed by a work vehicle, said implement comprising a main frame having front and rear ends and at least one horizontal member, said implement further comprising at least one steerable ground engaging wheel attached to the frame, comprising:
   (a) a ground engaging sensor member having a first and second end, the first end mounted to the frame such that the second end engages the ground, said ground engaging sensor member having side to side movement about a vertical axis and being in a neutral position when it is traveling in a plane substantially perpendicular to the horizontal member of the frame, and said ground engaging sensor means comprising an electrical signaling means for producing an electrical signal corresponding to the side to side movement;
   (b) a sensing means responsively associated with the ground engaging sensor member for receiving the electrical signal corresponding to the side to side movement and creating a second signal; and (c) a steering actuating means associated with the at least one steerable wheel for receiving said second signal and for effecting movement of the at least one steerable wheel in response to said second signal until the ground engaging sensor member is back to the neutral position.

46. A steering device as claimed in claim 45 wherein said electrical signaling means comprises a potentiometer.

47. A steering device for facilitating the steering of an implement towed by a work vehicle, said implement comprising a main frame having front and rear ends and at least one horizontal member, said implement further comprising at least one steerable ground engaging wheel attached to the frame, comprising:
  (a) a ground engaging sensor member having a first and second end, the first end pivotally mounted to the frame such that the second end engages the ground, said ground engaging sensor member having side to side movement about a vertical axis and being in a neutral position when it is traveling in a plane substantially perpendicular to the horizontal member of the frame, and said ground engaging sensor member comprising at least one arm or shaft carrying a ground riding means selected from the group consisting of a rolling coulter, a disc and a skid;
  (b) a sensing means responsively associated with said ground engaging sensor member for sensing the side to side movement of said ground engaging sensor member and for creating a signal corresponding to said side to side movement; and
  (c) a steering actuating means associated with the at least one steerable wheel for receiving said signal and for effecting movement of the at least one steerable wheel in response to said signal until the ground engaging sensor member is back to the neutral position.

\* \* \* \* \*